2,832,767
Patented Apr. 29, 1958

2,832,767

AMIDES OF POLYCHLOROPHENOXYACETIC ACID

Fred E. Boettner, Philadelphia, Pa., assignor to Rohm & Haas Company, Philadelphia, Pa., a corporation of Delaware No Drawing. Application August 19, 1954
Serial No. 451,046

3 Claims. (Cl. 260—211)

This invention relates to N-methyl-N-sorbityl-2,4-dichlorophenoxyacetamide and N - methyl - N - sorbityl-2,4,5-trichlorophenoxyacetamide. It further relates to a method for the preparation of these amides.

There are many known and used esters, amides, and salts of 2,4-dichlorophenoxyacetic acid and 2,4,5-trichlorophenoxyacetic acid. Most of these known derivatives are phytotoxic and herbicidal, and some have uses of a commercial stature. A great many of these derivatives, however, are water- and solvent-insoluble or are soluble in water and ordinary solvents to only a very slight or inappreciable extent. This lack of appreciable water and solvent solubility is a serious deterrent to their widespread use since such properties suggest and usually demand a complex, usually expensive, and often troublesome formulation in order to permit their use on a practical basis. Furthermore, in a great many instances, these known ester, salt, and amide derivatives of 2,4-dichlorophenoxyacetic acid and 2,4,5-trichlorophenoxyacetic acid exhibit high volatility. As a natural predictable consequence of such high volatility, experience has demonstrated that these known compounds migrate to nearby plant life frequently causing damage and death to fortuitously contacted plants. This characteristic of high volatility is an obvious barrier to the widespread use of these known compounds.

It is the principal object of the present invention to provide N - methyl - N - sorbityl - 2,4 - dichlorophenoxyacetamide and N - methyl - N - sorbityl - 2,4,5 - trichlorophenoxyacetamide, which are amides that are herbicidal in character, that have such low volatilities as to be substantially non-volatile, and that are soluble in water and common solvents.

It is also an object of this invention to provide a method for making N-methyl-N-sorbityl-2,4-dichlorophenoxyacetamide and N - methyl - N - sorbityl - 2,4,5 - trichlorophenoxyacetamide.

The present invention is concerned with N-methyl-N-sorbityl-2,4-dichlorophenoxyacetamide and N-methyl-N-sorbityl-2,4,5-trichlorophenoxyacetamide. These amides may be represented by the formula

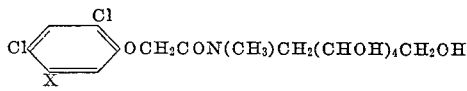

in which X is, in the one case, hydrogen and, in the other case, chlorine. These amides are prepared by reacting N-methylglucamine with 2,4-dichlorophenoxyacetic acid or 2,4,5-trichlorophenoxyacetic acid or their methyl esters. It is usually somewhat preferable to employ the acid rather than the methyl ester although the methyl ester form reacts quite readily to yield the desired amide.

The reactants of the present invention combine in equimolecular proportions, without the need of a catalyst, to produce the desired amides in yields consistently above 75% to 85%. During the course of the reaction, there is formed either water or methanol depending on the form of the reactant employed, that is, the acid or the ester, as has been previously discussed. When water is the by-product formed, such formation can serve as an indication of reaction completion. Water is readily separable from the reaction mixture and can then be collected and measured. The reaction is continued until the theoretical amount of water has been collected.

The present reaction is preferably conducted in the temperature range of about 75° to 100° C. to the reflux temperature of the reaction mixture. When the methyl ester form of the reactant is employed, the reaction starts at about 75° C., whereas when the acid form is used, the reaction doesn't effectively begin until about 100° C. In any case, the reaction mixture is heated at least to the reaction temperature which is either about 75° C. or about 100° C., depending on the form of the reactant employed. At lower temperatures, the reaction proceeds at such a slow rate as to be impractical. It is usually desirable from the viewpoint of speed and completeness of reaction to conduct the reaction at the reflux temperature of the reaction mixture. This is particularly true when water is the by-product formed, for under such conditions the water is readily separated and collected, and thereby serves as a reaction indicator as previously discussed.

It is preferable to employ an inert volatile organic solvent in this reaction in order to bring the reactants into an intimate chemical relationship. The reactants are solids at normal room temperatures and therefore can be advantageously brought into close contact by means of a solvent. Frequently the reactants are heated to the molten state, before the introduction of the solvent, in order to expedite the process of solution. Solvents suitable for this use are toluene, benzene, xylene, and the like. Actually, the presence of a solvent is not mandatory since the reaction occurs without one. However, the use of a solvent facilitates the reaction and leads to the formation of a product of a lighter color than would be produced otherwise. Hence, a solvent is usually employed.

The time of reaction is usually from about one to about ten hours depending largely on the temperature employed and the individual characteristics of the specific reactants. Usually, since an acid is reacted with the N-methylglucamine yielding water as a by-product and since this water may be collected and measured, the course of the reaction is easily followed. Of course, in most instances, the reaction is conducted for the longer periods of time in order to maximize yields.

At the conclusion of the reaction a solvent for the unused reactants, such as 2B benzene denatured ethanol, is added to the partially cooled reaction mixture. The temperature of the system is reduced by means of an ice salt bath until the product crystallizes. The crystalline product is removed by filtration and then decolorized and recrystallized, if desired. The products formed are valuable herbicides that are soluble in water, toluene, and kerosene, and have such low volatilities as to be considered nonvolatile. They may be distributed in sprays, dusts, and the like in the conventional formulations. The present products may also be used as detergents, particularly in applications involving glass. These compounds show surprising surface-activity and in small amounts greatly lower the surface tension of water.

The compounds of this invention are prepared in a manner disclosed in the following illustrative examples, in which parts by weight are used throughout.

Example 1

There were mixed together in a one liter three-neck flask, equipped with a thermometer, a stirrer, a reflux condenser, and a water separator, 128 parts of 2,4,5-trichlorophenoxyacetic acid and 97.5 parts of N-methylglucamine. This mixture was heated under a blanket of nitrogen until it became molten, 1 hour up to 100° C. After the mixture became molten, there was added 200 parts of xylene. The temperature of the system was increased until the reaction mixture was under reflux. The temperature was maintained at this level, 140° to 150° C., for about ten hours, during which time the amount of water theoretically formed in the reaction was collected in the water separator. The reaction mixture was cooled to 60° C. and there was then added 150 parts of 95% 2B benzene denatured ethanol. The mixture was cooled in an ice bath causing the crystallization of a micro-crystalline light tan solid. This solid was separated by filtration, then dissolved in boiling 95% ethanol, decolorized with carbon black, cooled in an ice-salt bath and again filtered. The product was a white crystalline solid that melted at 174°–178° C. The yield of purified product was in excess of 85%. The product contained 3.4% nitrogen (3.23% theoretical) and 24.4% chlorine (24.6% theoretical). The product was identified as N-methyl-N-sorbityl-2,4,5-trichlorophenoxyacetamide.

The above preparation was repeated without the use of xylene. The reaction temperature was 140°–150° C. and the reaction time was the same as before. The product, before purification, was somewhat darker in color than that previously obtained. The product was identified as the same desired amide as before.

Example 2

There were introduced into a reaction vessel 135 parts of methyl 2,4,5-trichlorophenoxyacetate and 97.5 parts of N-methylglucamine. The reaction mixture was heated under a blanket of nitrogen until it was molten, at which time there was added 200 parts of xylene. The reaction mixture was heated to the reflux temperature and held at that level for eight hours. At the end of the eight-hour reflux period, the reaction mixture was cooled to 60° C. There was added 150 parts of 95% 2B benzene denatured ethanol and then the resultant mixture was cooled in an ice bath. A microcrystalline solid formed and was removed by filtration. The solid was recrystallized and decolorized, with carbon black, from boiling 95% ethanol. The white crystalline product melted at 174°–178° C. The product contained 3.4% nitrogen (3.23% theoretical) and 24.4% chlorine (24.6% theoretical). The product was identified as N-methyl-N-sorbityl-2,4,5-trichlorophenoxyacetamide.

As in Example 1, Example 2 was repeated without the use of xylene. The desired amide was obtained as the product.

Example 3

Into a reaction vessel there were entered 110.5 parts of 2,4-dichlorophenoxyacetic acid and 97.5 parts of N-methylglucamine. The mixture was heated under a blanket of nitrogen for one hour up to 104° C., at the end of which time it was molten. There was then added 200 parts of xylene. The mixture was stirred under reflux for ten hours at the end of which time the theoretical amount of water had been separated and collected. The reaction mixture was then cooled to 60° C. and 200 parts of methanol was added. The mixture was cooled in an ice-salt bath whereupon a white crystalline solid formed. The solid product was separated by filtration and air-dried. The product was obtained in a yield greater than 75% and had a melting point of 110°–112° C. The white crystalline product contained 3.50% nitrogen (3.52% theoretical) and 17.5% chlorine (17.8% theoretical). The product was identified as N-methyl-N-sorbityl-2,4-dichlorophenoxyacetamide.

The above preparation was repeated without the use of xylene. The same product was obtained.

Example 4

There were mixed together in a reaction vessel 117.5 parts of methyl 2,4-dichlorophenoxyacetate and 97.5 parts of N-methylglucamine. The mixture was heated slowly under a blanket of nitrogen to melt the reactants. After the reactants were molten, there was added 200 parts of xylene. The mixture was stirred under reflux for nine hours, at the end of which time the system was cooled to 60° C. and 200 parts of methanol added thereto. The mixture was cooled in an ice-salt bath until a white crystalline solid formed. The solid product was separated by filtration and dried by air. The product melted at 110°–112° C. and contained 3.50% nitrogen (3.52% theoretical) and 17.5% chlorine (17.8% theoretical). The product was identified as N-methyl-N-sorbityl-2,4-dichlorophenoxyacetamide.

Similarly, the same amide product was formed when the above preparation was conducted without the use of xylene.

I claim:

1. As new compositions of matter, compounds having the formula

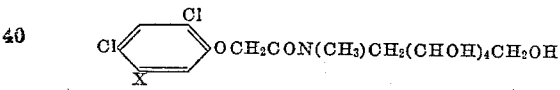

in which X is a member of the class consisting of hydrogen and chlorine.

2. As a new composition of matter, N-methyl-N-sorbityl-2,4-dichlorophenoxyacetamide.

3. As a new composition of matter, N-methyl-N-sorbityl-2,4,5-trichlorophenoxyacetamide.

References Cited in the file of this patent

UNITED STATES PATENTS

| | | |
|---|---|---|
| 1,985,424 | Piggott | Dec. 25, 1934 |
| 2,667,478 | Schwartz | Jan. 26, 1954 |
| 2,674,662 | Gilles et al. | Apr. 6, 1954 |
| 2,703,798 | Schwartz | Mar. 8, 1955 |